United States Patent
Hauger (10) Patent No.: US 10,222,597 B2
(45) Date of Patent: Mar. 5, 2019

(54) MEDICAL OPTICAL OBSERVATION INSTRUMENT AND METHOD FOR CONTRASTING POLARIZATION-ROTATING TISSUE

(71) Applicant: Carl Zeiss Meditec AG, Jena (DE)

(72) Inventor: Christoph Hauger, Aalen (DE)

(73) Assignee: CARL ZEISS MEDITEC AG, Jena (DE)

( * ) Notice: Subject to any disclaimer, the term of this patent is extended or adjusted under 35 U.S.C. 154(b) by 284 days.

(21) Appl. No.: 14/863,479

(22) Filed: Sep. 24, 2015

(65) Prior Publication Data

US 2016/0091702 A1  Mar. 31, 2016

(30) Foreign Application Priority Data

Sep. 26, 2014 (DE) .......................... 10 2014 114 013

(51) Int. Cl.
*H04N 11/02* (2006.01)
*G02B 21/00* (2006.01)
(Continued)

(52) U.S. Cl.
CPC ..... *G02B 21/0068* (2013.01); *G02B 21/0012* (2013.01); *G02B 21/0092* (2013.01);
(Continued)

(58) Field of Classification Search
CPC ................ G01N 24/08; G01N 24/088; G01N 2021/1793; G01N 21/1702; G01N 21/47;
(Continued)

(56) References Cited

U.S. PATENT DOCUMENTS

| 5,333,052 A | 7/1994 | Finarov |
| 5,450,201 A | 9/1995 | Katzir et al. |

(Continued)

FOREIGN PATENT DOCUMENTS

| DE | 20 2007 012 433 U1 | 1/2009 |
| DE | 20 2008 001 363 U1 | 7/2009 |

OTHER PUBLICATIONS

Axer et al.; "Orientation of the Nerve Fibres in the Human Brain Made Visible", Bildverarbeitung fuer die Medizin, 2001, 10 pages total.

(Continued)

*Primary Examiner* — Leron Beck
*Assistant Examiner* — Kehinde Abimbola
(74) *Attorney, Agent, or Firm* — Nixon Peabody LLP; Jeffrey L. Costellia (57) ABSTRACT

A medical optical observation instrument including an illumination system, which provides an illumination beam path for illuminating an observation object with illumination light, an observation system, which provides an observation beam path for observing the observation object and at least one camera for recording a digital image of the observation object, and a device for contrasting polarization-rotating tissue in the observation object. The device for contrasting polarization-rotating tissue in the observation object includes at least one illumination apparatus, arranged in the illumination system, including a polarization portion, at least one linear analyzer, arranged in the observation system and rotatable about the optical axis of the observation beam path, an image processing apparatus connected to the at least one camera, and an optimization apparatus connected to the image processing apparatus and to the at least one rotatable linear analyzer and the polarization portion.

14 Claims, 4 Drawing Sheets

(51) Int. Cl.
*G02B 21/36* (2006.01)
*G02B 21/22* (2006.01)

(52) U.S. Cl.
CPC ........... *G02B 21/22* (2013.01); *G02B 21/361* (2013.01); *G02B 21/365* (2013.01)

(58) Field of Classification Search
CPC ........... G01N 21/8483; G01N 29/2418; G01N 21/3563; G01N 21/78; G01N 21/9508; G01N 2015/1018; G01N 2021/0325; G01N 2021/39; G01N 21/399; G01N 2021/4709; G01N 2021/4735; G01N 21/718; G01N 2201/0616; G01N 2201/062

See application file for complete search history.

(56) References Cited

U.S. PATENT DOCUMENTS

| | | | | |
|---|---|---|---|---|
| 6,423,956 B1* | 7/2002 | Mandella | ............... | G02B 1/105 250/201.3 |
| 6,713,742 B2* | 3/2004 | Mandella | ............... | G02B 1/105 250/201.3 |
| 8,285,363 B2* | 10/2012 | Malackowski | .......... | A61B 5/06 600/424 |
| 2003/0034431 A1* | 2/2003 | Mandella | ............... | G02B 1/105 250/201.3 |
| 2003/0227597 A1* | 12/2003 | Silverstein | ........... | H04N 5/7441 353/20 |
| 2004/0184007 A1* | 9/2004 | Silverstein | ............. | G02B 13/22 353/20 |
| 2006/0072106 A1* | 4/2006 | Matsui | ................... | G01N 21/21 356/237.5 |
| 2006/0192904 A1* | 8/2006 | Almogy | ............... | G01N 21/956 349/6 |
| 2006/0241495 A1* | 10/2006 | Kurtz | ................... | A61B 5/0059 600/476 |
| 2007/0225595 A1* | 9/2007 | Malackowski | .......... | A61B 5/06 600/424 |
| 2008/0312530 A1* | 12/2008 | Malackowski | .......... | A61B 5/06 600/426 |
| 2011/0013144 A1* | 1/2011 | Silverstein | ............. | G03B 33/06 353/8 |
| 2011/0032607 A1* | 2/2011 | Abele | .................... | G02B 21/22 359/376 |
| 2011/0202017 A1* | 8/2011 | Reimer | .................. | A61B 3/103 604/290 |
| 2013/0107357 A1* | 5/2013 | Silverstein | ............. | G02B 7/028 359/364 |
| 2013/0137972 A1* | 5/2013 | Malackowski | .......... | A61B 5/06 600/424 |
| 2015/0182123 A1* | 7/2015 | Sato | ...................... | A61B 5/0059 600/407 |
| 2015/0209105 A1* | 7/2015 | Margallo Balbas | ... | A61B 18/24 600/301 |
| 2016/0170194 A1* | 6/2016 | Mueller | ................. | A61B 90/20 359/376 |
| 2017/0027639 A1* | 2/2017 | Margallo Balb s | .. | A61B 5/0075 |

OTHER PUBLICATIONS

German Office Action for German Application No. 10 2014 114 013.3, dated Jun. 18, 2015, 16 pages total.

German Office Action (Application No. 102014114013.3) dated May 5, 2017.

* cited by examiner

MEDICAL OPTICAL OBSERVATION INSTRUMENT AND METHOD FOR CONTRASTING POLARIZATION-ROTATING TISSUE

The present invention relates to a medical optical observation instrument and, in particular, to a surgical microscope. Additionally, the invention relates to a method for contrasting polarization-rotating tissue in an image, obtained by means of a medical optical observation instrument, of an observation object containing a polarization-rotating tissue.

During neurosurgical interventions, nerve fiber tracts can only be differentiated very badly from surrounding tissue. Here, there is a risk of damaging nerve fiber tracts during tumor or vessel operations and therefore impair functional areas. It is for this reason that there is a need for improved intra-surgical contrasting of the nerve fiber tracts.

This object is achieved by a medical optical observation instrument according to claim 1 and by a method for contrasting polarization-rotating tissue according to claim 15. The dependent claims contain advantageous embodiments of the invention.

A medical optical observation instrument according to the invention comprises an illumination system, which comprises an illumination beam path for illuminating an observation object with illumination light. Furthermore, it comprises an observation system, which comprises an observation beam path for producing an image of the observation object with the aid of reflected illumination light emanating, referred to as observation light below, from the observation object and at least one camera, to which illumination light is fed for recording a digital image of the observation object, and a device for contrasting polarization-rotating tissue, such as, in particular, nerve fiber tracts, in the observation object, which device is connected to the at least one camera for receiving the digital image of the observation object. The device for contrasting polarization-rotating tissue in the observation object comprises:

- at least one illumination apparatus, arranged in the illumination system, comprising a polarization portion, which is suitable for producing illumination light with a linear polarization that is adjustable in the plane perpendicular to the optical axis of the illumination beam path,
- at least one linear analyzer, arranged in the observation system and rotatable about the optical axis of the observation beam path, for determining the polarization direction of the observation light,
- an image processing apparatus connected to the at least one camera for receiving the digital image of the observation object, which image processing apparatus establishes and outputs an image contrast value representing the image contrast in the digital image of the observation object, and
- an optimization apparatus connected to the image processing apparatus for receiving the image contrast value and connected to the at least one rotatable linear analyzer and the polarization portion for outputting actuation signals, which optimization apparatus maximizes the image contrast value by adapting the polarization direction of the illumination light and the polarization direction of the linear analyzer with the aid of the actuation signals.

The present invention can be used, in particular, for contrasting nerve fiber tracts. What is used here is that anisotropic substances of the nerve fibers, such as the myelin components, rotate the polarization direction of polarized light. By way of example, this is described in A. Axer, T. Rings, M. Axer and D. Graf von Keyserlingk, Bildverarbeitung für die Medizin ["Image processing for medicine"] 2001, Informatik aktuell ["Contemporary information technology"] 2001, pages 330 to 334. Therefore, what can be achieved by adjusting the orientation of the polarization direction of the linear analyzer in relation to the orientation of the polarization direction in the illumination light when nerve fiber tracts are illuminated by suitably linearly polarized light is that the linearly polarized light rotated by the nerve fiber tracts substantially can pass the linear analyzer, whereas light that was reflected by tissue in the surroundings of the nerve fiber tracts and therefore did not experience a rotation in the polarization direction substantially cannot pass the linear analyzer. Consequently, the intensity values of pixels depicting the nerve fiber tracts are higher than the intensity values of pixels depicting no nerve fiber tracts in the image recorded by the camera when the linear analyzer is adjusted, and so a high image contrast is created. Therefore, within the scope of the present invention, there is an adjustment of the linear analyzer in relation to the orientation of the polarization direction in the illumination light such that high contrasting of the nerve fiber tracts is achieved by maximizing the image contrast. Here, by rotating the polarization portion of the illumination apparatus, it is possible to set a polarization direction in the linearly polarized illumination light which is suitable in view of the ideal effect of the nerve fiber tracts when rotating the polarization direction. Since the adjustment of the orientation of the polarization direction of the linear analyzer in relation to the orientation of the polarization direction in the illumination light can be implemented in an automated manner on the basis of the image recorded by the camera, the medical optical observation instrument according to the invention enables automated contrasting of nerve fiber tracts. Thus, in the method according to the invention for contrasting nerve fiber tracts, a digital image of the observation object is recorded with the aid of the cameras of a medical optical observation instrument according to the invention, the image contrast is established in the digital image of the observation object, and the image contrast is maximized by adapting the polarization direction of the illumination light and the polarization direction of the linear analyzer. In addition to contrasting nerve fiber tracts, the invention can also be used in an analogous manner for contrasting different tissue which rotates the polarization direction.

In particular, the medical optical observation instrument may comprise an observation system with two stereoscopic subsystems, wherein each stereoscopic subsystem comprises a stereoscopic beam path and a camera is arranged in each one of the stereoscopic subsystems, with observation light for recording a digital partial image of the observation object being fed to said camera such that the digital image of the observation object is a stereoscopic image. In this case it is possible to create e.g. a purely digital surgical microscope, which enables a contrasted image of polarization-rotating tissue as soon as the image contrast of the camera images is optimized.

If an eyepiece and a first beam splitter are arranged in each one of the stereoscopic subsystems in the medical optical observation instrument, wherein the first beam splitter guides one portion of the observation light situated in the stereoscopic subsystem in the direction of the camera of the stereoscopic subsystem and another portion of the observation light situated in the stereoscopic subsystem in the direction of the eyepiece of the stereoscopic subsystem, then it is also possible to generate a purely optical image with contrasted polarization-rotating tissue as soon as the image contrast of the camera images is optimized.

If, moreover, a display and a second beam splitter are arranged in each one of the stereoscopic subsystems, wherein the second beam splitter is situated between the first beam splitter and the eyepiece and couples a beam path emanating from the display in the direction of the eyepiece into the stereoscopic partial beam path of the stereoscopic subsystem, then a hybrid image can be offered to the observer, in which hybrid image a conventional optical image of the observation object without contrasted polarization-rotating tissue is superposed on an electronically generated image, which highlights the polarization-rotating tissue. Here, it is possible to arrange the analyzer in the beam path of the stereoscopic subsystem between the first beam splitter and the camera such that the illumination light fed to the eyepiece does not experience intensity losses since it does not pass the linear analyzer. By contrast, the images recorded by the cameras show contrasted polarization-rotating tissue after optimization of the image contrast; by way of electronic image processing, this can be superposed on the non-contrasted image generated purely optically for the purpose of generating the hybrid image. If, moreover, a shutter is arranged between the first beam splitter and the second beam splitter in each one of the stereoscopic partial beam paths, it is possible to alternate between, firstly, an optical display or hybrid display and, secondly, a purely electronic display of the contrasted polarization-rotating tissue. For the purposes of the purely electronic display of the contrasted polarization-rotating tissue, the shutters are introduced into the beam path between the beam splitters such that only an image shown by means of the display reaches the eyepieces. Here, a purely electronic display or hybrid display also renders it possible to highlight the polarization-rotating tissue by false-color displays, contour lines or the like.

In the medical optical observation instrument according to the invention, the illumination apparatus may be configured in such a way that it comprises an illumination light source and, as a polarization portion, a linear polarizer, rotatable about the optical axis of the illumination beam path, for polarizing the illumination light emanating from the illumination light source. In this case, it is possible to make use of a simple illumination light source which does not emit polarizing light. Alternatively, the illumination apparatus may comprise an illumination light source emitting linearly polarized light as a polarization portion, which illumination light source is rotatably mounted about the optical axis of the illumination beam path. By way of example, a laser, an incandescent lamp or a luminescence emitter such as a gas discharge lamp, a light-emitting diode, etc. can be used as illumination light source. If a laser is used, it is possible to use an infrared laser. It is possible to use an infrared laser if there is an electronic display or hybrid display of the contrasted polarization-rotating tissue. The profile of the polarization-rotating tissue can be established on the basis of the infrared image, which is not visible in the eyepieces, and it can be converted into a visible image which is then coupled into the illumination beam path of the respective stereoscopic subsystem in the direction of the eyepiece via the second beam splitter by means of the display.

The illumination light source may comprise a primary light source emitting the illumination light, a secondary light source, an optical waveguide with an input end and an output end, and a coupling apparatus for coupling the illumination light into the input end of the optical waveguide. In this embodiment of the illumination light source, the output end of the optical waveguide is the secondary light source. The use of an optical waveguide renders it possible to arrange the primary light source at a distance from the medical optical observation instrument. In general, the primary light sources need to be cooled, which may lead to vibrations. The use of an optical waveguide renders it possible to decouple the medical optical observation instrument from the vibrations created by the cooling.

If a light source emitting polarized light is used as a primary light source, the optical waveguide may comprise at least one polarization-maintaining fiber. By way of example, it is possible to use an infrared laser emitting polarized light, the light of which is coupled into the at least one polarization-maintaining fiber. The light from a further light source, which e.g. emits unpolarized visible light, can then be coupled into the remaining fibers of the optical waveguide. However, in principle, it is also possible to configure all fibers of the optical waveguide to maintain polarization.

If the illumination light source comprises a primary light source that emits unpolarized light and a linear polarizer for polarizing the light, it is advantageous if the linear polarizer is arranged between the output end of the optical waveguide and the observation object, since the optical waveguide then need not comprise any polarization-maintaining fibers.

In an advantageous development of the medical optical observation instrument according to the invention, the device for contrasting polarization-rotating tissue comprises:

a navigation data input for receiving navigation data from a navigation system, a data input for receiving pre-surgical data, e.g. from a storage medium or a tomography system, an introduction device for introducing the at least one linear analyzer into the observation beam path, an introduction or switching-on device for introducing the polarization portion into the illumination beam path or for switching on the polarization portion, and a control unit for controlling the introduction device and the introduction or switching-on device, which control unit is connected to the data input for receiving pre-surgical data and connected to the navigation data input for receiving navigation data, establishes whether the medical optical observation instrument is directed onto polarization-rotating tissue on the basis of the received navigation data and the received pre-surgical data, and actuates the introduction device and the introduction or switching-on device when the medical optical observation instrument is directed onto polarization-rotating tissue.

In this way, it is possible to start the execution of the method according to the invention for contrasting polarization-rotating tissue, in particular for contrasting nerve fiber tracts, in an automated manner as soon as the medical optical observation instrument is directed onto polarization-rotating tissue such as e.g. a nerve fiber tract. Accordingly, the method can be stopped by virtue of the polarization portion of the illumination apparatus being removed from the illumination beam path or being switched off as soon as the medical optical observation instrument is no longer directed onto polarization-rotating tissue. As a result, it is possible to avoid the identity loss by the polarization of the illumination light and the analysis of the observation light when no polarization-rotating tissue is observed. By way of example, the pre-surgical data may be available in the form of magnetic resonance imaging data (MRI data) or of other tomography data.

Further features, properties and advantages of the present invention emerge from the following description of exemplary embodiments, with reference being made to the attached figures.

Below, a surgical microscope 2 configured according to the invention is explained with reference to FIGS. 1 and 2 as a first exemplary embodiment for a medical optical observation instrument according to the invention. The surgical microscope 2 comprises an illumination system, which provides an illumination beam path 42 for illuminating an observation object 3 with illumination light, and an observation system, which provides an observation beam path 9A, 9B for producing an observation image.

Figure 1:
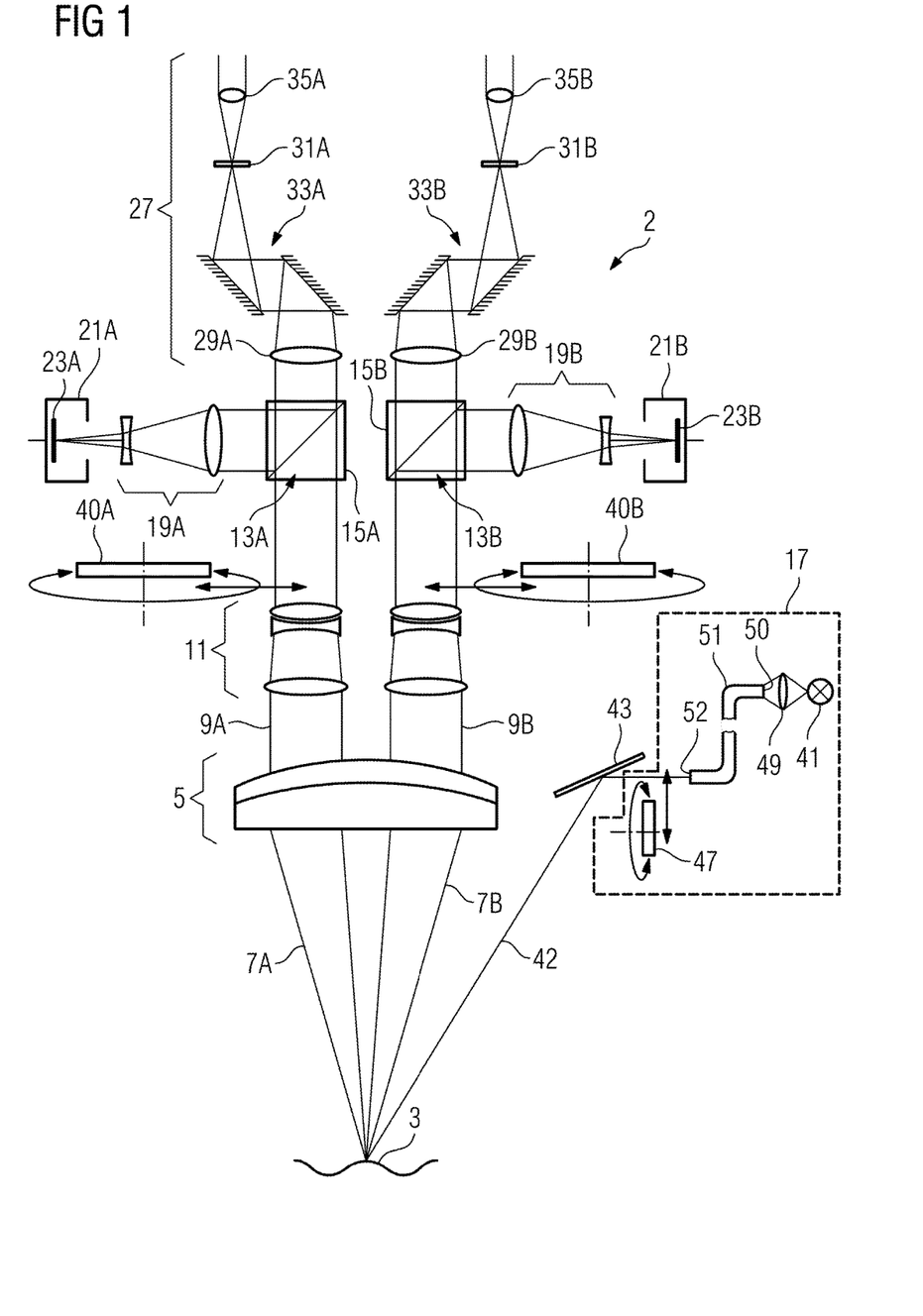
FIG. 1 shows the optical components of a first exemplary embodiment for the medical optical observation instrument according to the invention.
Figure 2:
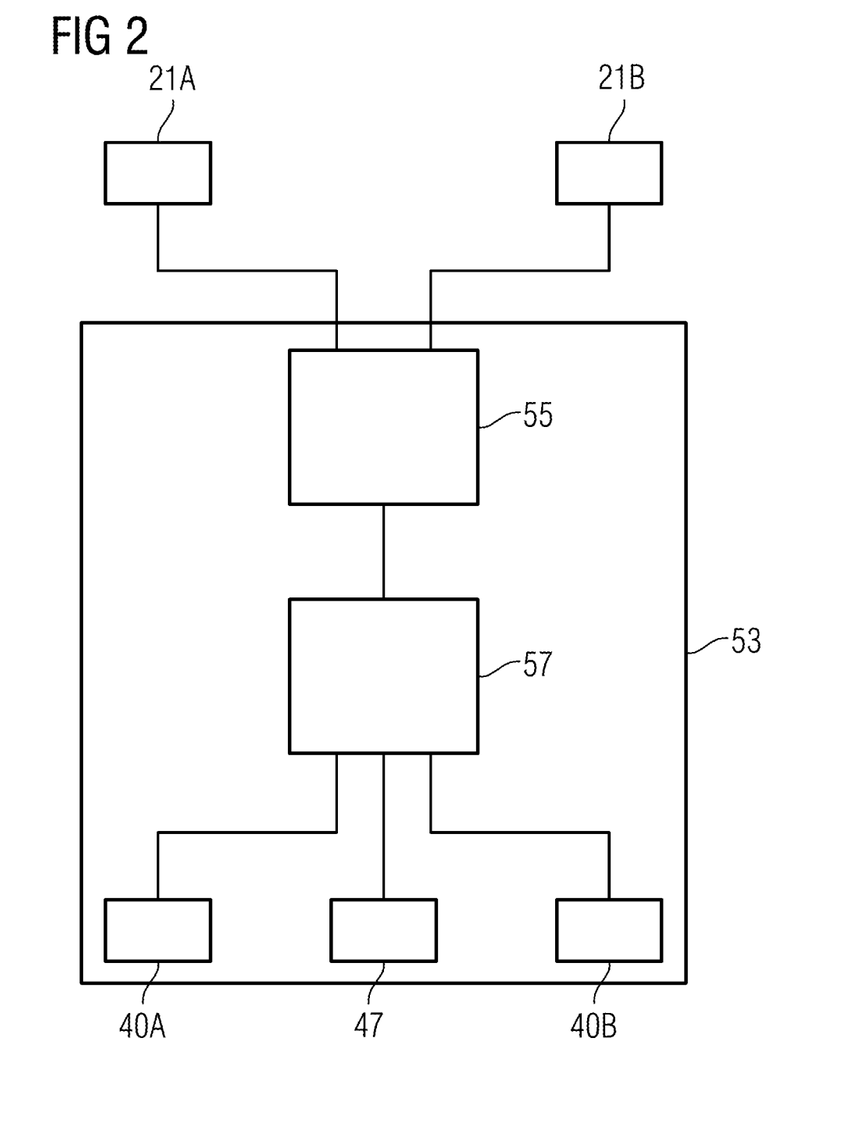
FIG. 2 shows the device for contrasting nerve fiber tracts from the first exemplary embodiment.

The observation system of the surgical microscope 2 shown in FIG. 1 serves to observe an object field 3, which contains tissue with nerve fiber tracts. It comprises an objective 5 facing the object field 3, which objective can, in particular, be embodied as an achromatic or apochromatic objective. In the present exemplary embodiment, the objective 5 consists of two partial lenses cemented together, which form an achromatic objective. The object field 3 is arranged in the focal plane of the objective 5 such that it is imaged at infinity by the objective 5. In other words, a divergent beam 7 emanating from the object field 3 is converted into a parallel beam 9 when passing through the objective 5.

In the embodiment variant of the surgical microscope 2 shown in FIG. 1, the objective 5 merely consists of an achromatic lens. However, it is also possible to use an objective lens system comprising a plurality of lenses, in particular a so-called varifocal objective, by means of which the working distance of the surgical microscope 2, i.e. the distance of the object-side focal plane from the vertex of the first object-side lens face of the objective 5, also referred to as object back focus, can be varied. A varifocal objective also images the object field 3 arranged in the focal plane to infinity such that a parallel beam is present on the observer side.

A magnification changer 11 is arranged at the observer side of the objective 5, which magnification changer may be embodied either—as in the exemplary embodiment illustrated—as a zoom system for changing the magnification factor in a continuously variable fashion or as a so-called Galilean changer for changing the magnification factor step by step. In a zoom system constructed e.g. from a lens combination comprising three lenses, the two object-side lenses can be displaced in order to vary the magnification factor. In actual fact, however, the zoom system may also comprise more than three lenses, e.g. four or more lenses, wherein the outer lenses can then also be arranged in a fixed fashion. In a Galilean changer, by contrast, there are a plurality of fixed lens combinations which represent different magnification factors and can be introduced into the beam path alternately. Both a zoom system and a Galilean changer convert an object-side parallel beam into an observer-side parallel beam having a different beam diameter. In the present exemplary embodiment, the magnification changer 11 is already part of the binocular beam path of the surgical microscope 2, that is to say that it has a dedicated lens combination for each stereoscopic partial beam path 9A, 9B of the surgical microscope 2.

An interface arrangement 13A, 13B is adjacent to the magnification changer 11 on the observer side, which interface arrangement comprises beam splitter prisms 15A, 15B in the present exemplary embodiment. In principle, however, other types of beam splitters may also be used, e.g. partly transmissive mirrors. In the present exemplary embodiment, the interfaces 13A, 13B serve for coupling out beams from the partial beam paths of the surgical microscope 2. The decoupled beams are fed to cameras 21A, 21B with electronic image sensors 23A, 23B via adapter optics 19A, 19B. By way of example, the image sensors may be implemented as CCD sensors or CMOS sensors. Electronic and, in particular, digital stereoscopic partial images of the object field 3 are recorded by means of the cameras 21A, 21B.

A binocular tube 27 is adjacent to the interface arrangement 13A, 13B on the observer side. Said binocular tube comprises two tube objectives 29A, 29B which focus the respective parallel beam 9A, 9B onto an intermediate image plane 31A, 31B, that is to say image the object field 3 onto the respective intermediate image plane 31A, 31B. The intermediate images situated in the intermediate image planes 31A, 31B are finally imaged toward infinity by eyepiece lenses 35A, 35B such that an observer can observe these with a relaxed eye. Moreover, in the binocular tube 27, the distance between the two partial beams 9A, 9B is magnified by means of a mirror system or by means of prisms 33A, 33B in order to adapt the distance to the intraocular distance of the observer. Image erection is additionally carried out by means of the mirror system or the prisms 33A, 33B.

The surgical microscope 2 is moreover equipped with an illumination system, by means of which the object field 3 can be illuminated with illumination light along an illumination beam path 42. For producing the illumination light, the illumination system has an illumination apparatus 17, which comprises a self-luminous primary light source 41 such as a halogen incandescent lamp, a gas-discharge lamp, a light-emitting diode etc. and an optical waveguide 51 with an input end 50 and an output end 52 in the present exemplary embodiment. The light emanating from the primary light source 41 is coupled into the input end of an optical waveguide 51 by way of a coupling apparatus 49 and emerges from the output end 52 of the optical waveguide 51, which forms a non-self-luminous secondary light source. In the present exemplary embodiment, the illumination light emerging from the output end 52 of the optical waveguide 51 is directed in the direction of the object field 3 via a deflection mirror 43 or deflection prism in order to illuminate said object field. Moreover, illumination optics (not depicted in FIG. 1), which ensure homogeneous illumination of the whole observed object field 3, may be present in the illumination system.

The surgical microscope 2 depicted in FIG. 1 is equipped with a device 53 for contrasting polarization-rotating tissue in the object field 3. This device is depicted schematically in FIG. 2. It comprises a linear polarizer 47, which can be introduced into the illumination beam path 42 when nerve fiber tracts, which constitute polarization-rotating tissue, are intended to be contrasted in the tissue situated in the object field 3. The linear polarizer 47 is mounted in such a rotatable manner that it can be rotated about the optical axis of the illumination beam path 42 when it is inserted into the illumination beam path 42. By rotating the linear polarizer about the optical axis of the illumination beam path 42, it is possible to set the polarization direction of the illumination light reaching the object field 3 in order to be able to set the polarization direction in a suitable manner in view of the rotation of the polarization direction by the anisotropic substances of the nerve fibers.

Furthermore, the device 53 for contrasting polarization-rotating tissue 2 comprises two linear analyzers 40A, 40B, which can be inserted into the observation partial beam paths 9A, 9B when the nerve fiber tracts (or a different polarization-rotating tissue) of the tissue situated in the object field 3 is intended to be contrasted. The linear analyzers 40A, 40B are mounted in such a way that they can be rotated about the optical axes of the stereoscopic partial beam paths 9A, 9B when these are introduced into the partial beam paths. In the present exemplary embodiment, the linear analyzers 40A, 40B are situated between the magnification changer 11 and the interface arrangement 13A, 13B.

Suitably actuatable actuators are present in the surgical microscope for rotating the linear analyzers 40A, 40B. Accordingly, a suitable controllable actuator is present for rotating the linear polarizer 47 in the illumination beam path 42. Here, the individual actuators are controllable independently of one another such that the polarization direction in the illumination light can be set independently of the setting of the polarization direction of the analyzers 40A, 40B with the aid of the polarizer 47.

The device for contrasting polarization-rotating tissue furthermore comprises an image processing apparatus 55, which is connected to the cameras 21A, 21B in the observation system of the surgical microscope 2 for receiving digital stereoscopic partial images, and an optimization apparatus 57, which is connected firstly to the image processing apparatus 55 and connected secondly to the linear polarizer 47 and the linear analyzers 40A, 40B. On the basis of at least one of the received stereoscopic partial images, the image processing apparatus establishes a contrast value which represents the contrast in the received image. By way of example, the contrast value may be calculated on the basis of the Michelson contrast, which is formed, firstly, by the ratio from the difference between the maximum intensity in the image and the minimum intensity in the image and, secondly, the sum of the maximum intensity in the image and of the minimum intensity in the image. Here, the intensity values may correspond either to grayscale values or brightness values on the L-axis of the Lab color space. In the Lab color space, a color is characterized on the basis of an axis "L", which specifies the brightness (luminance) of the color with values from 1 to 100, an axis "a", along which the green component of a color lies in the negative value range and the red component of a color lies in the positive value range, and an axis "b", along which the blue component of a color lies in the negative value range and the yellow component of a color lies in the positive value range.

Instead of using the maximum intensity and the minimum intensity of the overall image for establishing the Michelson contrast, it is also possible to decompose the image into small sections, for which the Michelson contrast is calculated in each case. Then, e.g. a mean value or a different statistical measure relating to the individual Michelson contrast values can be formed as contrast value.

The contrast value is output from the image processing apparatus 55 to the image optimization apparatus 57. On the basis of the currently received contrast value, for example by way of a comparison with at least one previously received contrast value and a model for the profile of the contrast value as a function of the polarization directions of the polarizer 47 and of the analyzers 40A, 40B, said image optimization apparatus establishes a new polarization direction of the polarizer 47 and/or a new polarization direction of the analyzers 40A, 40B. This continues until a maximum of the contrast value has been reached. By way of example, the optimization device may identify a maximum by virtue of the contrast value decreasing independently of how the polarization direction of the analyzers 40A, 40B and/or the polarization direction of the polarizer 47 is modified. The setting of the polarization direction of the linear polarizer 47 and the polarization direction of the linear analyzers 40A, 40B, at which the maximum in the contrast value occurs, is then kept constant.

If contrasting of the nerve fiber tracts is no longer desired, the linear polarizer 47 and the linear analyzers 40A, 40B can be removed from the beam paths again.

Figure 3:
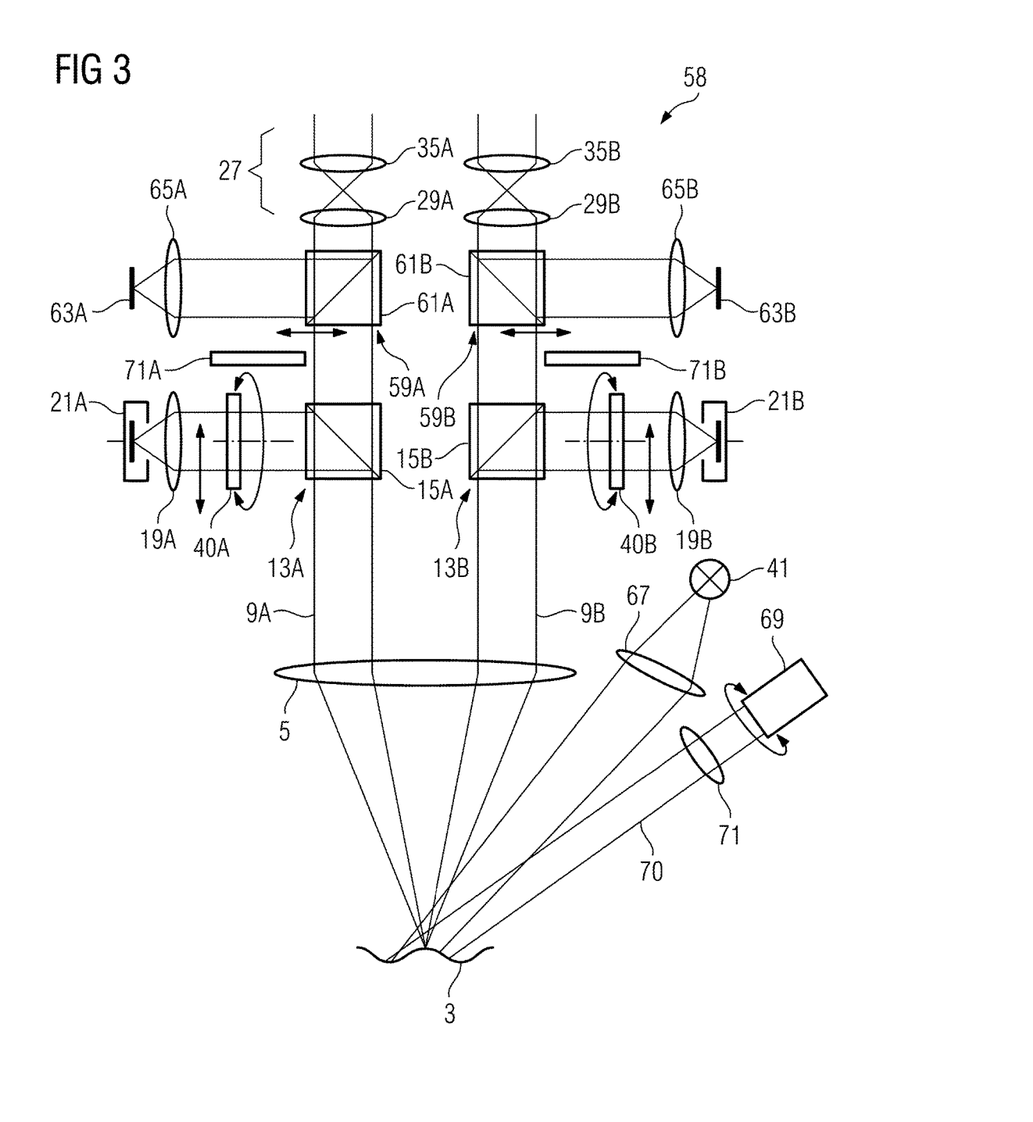
FIG. 3 shows the optical components of a second exemplary embodiment for the medical optical observation instrument according to the invention.

A second exemplary embodiment for the medical optical observation instrument according to the invention is depicted in FIG. 3. Like the medical optical observation instrument of the first exemplary embodiment, the medical optical observation instrument of the second exemplary embodiment is embodied as a surgical microscope. Features of the surgical microscope 58 depicted in FIG. 3, which correspond to the features of the surgical microscope 2 depicted in FIG. 1, are denoted by the same reference signs in both FIG. 3 and FIG. 1 and are not explained again in order to avoid repetition.

A first difference between the surgical microscope 58 depicted in FIG. 3 and the surgical microscope 2 depicted in FIG. 1 lies in the fact that displays 63A, 63B and a second interface arrangement 59A, 59B with beam splitter prisms 61A, 61B (or alternatively with partly transmissive mirrors) are present. The beam splitter prisms 61A, 61B of the second interface arrangement 59A, 59B are arranged on the observer side of the beam splitter prisms 15A, 15B of the first interface arrangement 13A, 13B. By way of the beam splitter prisms 61A, 61B of the second interface arrangement 59A, 59B, it is possible to couple images depicted on the displays 63A, 63B into the stereoscopic observation partial beam paths 9A, 9B in the direction of the binocular tube 27 with the aid of display optics 65A, 65B.

Furthermore, the surgical microscope 58 shown in figure differs from the surgical microscope 2 shown in FIG. 1 by virtue of the linear analyzers 40A, 40B being arranged between the first beam splitters 13A, 13B and the cameras 21A, 21B rather than between the magnification changer 11 and the first beam splitters 13A, 13B. Therefore, the linear analyzers 40A, 40B are not situated in the beam path leading to the binocular tube 27. The optimization of the image contrast therefore merely has an effect on the contrast in the images recorded by the cameras 21A, 21B, and not on the contrast in the intermediate images observed with the eyepieces 35A, 35B. Therefore, there is no contrasting of the nerve fiber tracts in the intermediate images observed by the eyepieces 35A, 35B. In order nevertheless to be able to observe an image with contrasted nerve fiber tracts by way of the binocular tube 27, the information about the position of the nerve fiber tracts is taken from the images recorded by the cameras 21A, 21B by image processing means and prepared in such a way that it can be superposed on to the intermediate images with the aid of the displays 63A, 63B, for example as a contour image or as colored regions. This procedure enables high flexibility in the type of display of the contrasted nerve fiber tracts. Moreover, the identifiability of tissue regions outside of the nerve fiber tracts is reduced to a lesser extent than in the surgical microscope depicted in FIG. 1 since light from such tissue regions is not suppressed by the analyzers 40A, 40B in the beam paths leading to the intermediate images.

In contrast to the surgical microscope 2 depicted in FIG. 1, the illumination system in the surgical microscope 58 depicted in FIG. 3 has two light sources, namely a conventional light source 41, which emits unpolarized light, and an infrared laser, which emits linearly polarized infrared light. Both light sources may be used, either individually or together, for illuminating the object field 3. The infrared laser 69 is mounted in such a way that it can be rotated about the optical axis thereof such that the polarization direction of the laser light about the optical axis of the illumination beam path 70 can be set. The object field 3 is illuminated by the light of the conventional light source 41 by means of first illumination optics 67 and by the light of the infrared laser by means of second illumination optics 71. If contrasting of nerve fiber tracts is unwanted, the laser 69 can be switched off. It should be noted here that common illumination optics may also be present for the conventional light source 41 and the infrared laser and that other light sources emitting polarized light can be used instead of the infrared laser.

Since the illumination light used in the exemplary embodiment shown in FIG. 3 for contrasting the nerve fiber tracts lies outside of the visible spectral range, the image observed through the eyepieces 35A, 35B is not influenced in terms of the brightness thereof by the illumination used for contrasting. In particular, it is possible to set the conventional illumination for visual observation completely independently of the polarized illumination for contrasting the nerve fiber tracts.

As described above, the contrasting is displayed in the intermediate images observed by the eyepieces 35A, 35B by virtue of the contrast information being superposed into the intermediate images with the aid of the displays 63A, 63B. However, alternatively, it is also possible to observe a purely electronic image through the eyepieces 35A, 35B. To this end, shutters 71A, 71B can be arranged in the stereoscopic partial beam paths 9A, 9B between the first beam splitter prisms 15A, 15B and the second beam splitter prisms 61A, 61B. Said shutters can be introduced into the partial beam paths 9A, 9B in order to prevent the entry of illumination light into the second beam splitter prisms 61A, 61B. An observer peering through the eyepieces 35A, 35B then merely sees the images shown on the displays 63A, 63B. Then, the images recorded by the cameras 21A, 21B, which of course also comprise the visible spectral range, are depicted on the displays 63A, 63B. Information obtained with the aid of the infrared light about the nerve fiber tracts can be inserted into these images such that an electronic image, in which the nerve fiber tracts are highlighted with high contrast, is produced.

In an alternative embodiment of the second exemplary embodiment, it is possible to use an illumination apparatus as depicted in FIG. 1 instead of the illumination apparatus with the two light sources 41 and 69 depicted in FIG. 3. In this case, contrasting of the nerve fiber tracts would be implemented in the same way as was described with reference to the first exemplary embodiment, wherein the contrasted image is recorded by the cameras 21A, 21B and depicted on the displays 63A, 63B.

Figure 4:
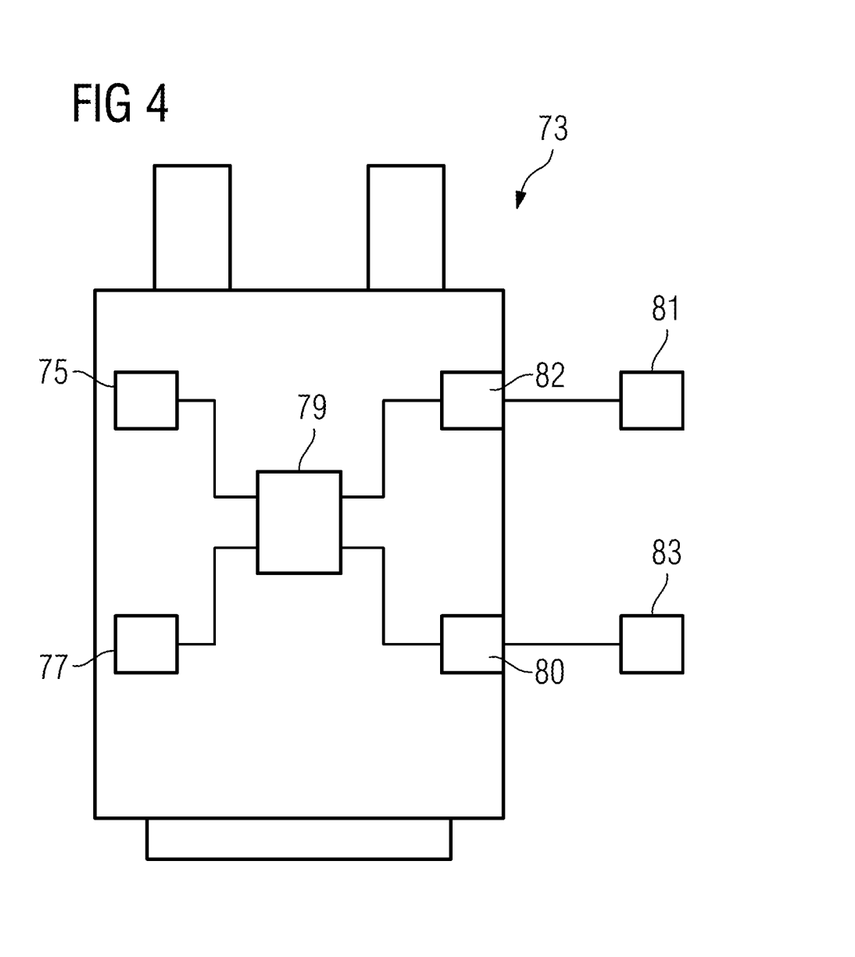
FIG. 4 shows a development of the medical optical observation instrument according to the invention.

A development of the medical optical observation instrument according to the invention is depicted schematically in FIG. 4. The medical optical observation instrument from FIG. 4 is a surgical microscope 73 according to the invention, which, in particular, may be embodied like the surgical microscope 2 from FIG. 1 or like the surgical microscope 58 from FIG. 3. In the development shown in FIG. 4, the surgical microscope 73 is equipped with an introduction device 75 for introducing the linear analyzers 40A, 40B into the respective stereoscopic partial beam paths and with an introduction or switching-on device 77 for introducing the linear polarizer 47 into the observation beam path or for switching-on the infrared laser 69. The introduction device 75 and the introduction or switching-on device 77 are connected to a control unit 79, which in turn is connected to a navigation data input 80 for receiving navigation data from a navigation system 81 and a data input 82 for receiving pre-surgical data from a storage medium 83 containing such data. In addition, or as an alternative, to retrieving pre-surgical data from the storage medium 83, the control unit 79 can retrieve pre-surgical data from a tomography system via the data input 82.

The navigation system 81 establishes position and orientation data of the surgical microscope 73 in relation to the object field 3, which data are retrieved by the control unit 79. The pre-surgical data stored in the storage medium 83 contain position data of the nerve fiber tracts in the object field 3. By way of example, the position data may originate from magnetic resonance imaging data (MRI data) or other tomography data. Moreover, images obtained by magnetic resonance imaging or a different tomography method can be stored for retrieval purposes in the storage medium 83.

The control unit 79 determines whether or not the focal point of the surgical microscope 73 is directed onto the nerve fiber tracts on the basis of the received pre-surgical data and the navigation data. If the control unit 79 determines that the focal point is directed onto nerve fiber tracts, it prompts the introduction device 75 to introduce the linear analyzers 40A, 40B into the observation beam paths and it prompts the introduction or switching-on device 77 to introduce the linear polarizer 47 into the illumination beam path or to switch on the light source for polarized light. In this manner, it is possible to start the method for contrasting nerve fiber tracts in an automated manner as soon as nerve fiber tracts are observed using the surgical microscope 73. Moreover, it is possible to compare the profile of the nerve fiber tracts in the intra-surgical image obtained by the surgical microscope 73 with the profile of the nerve fiber tracts in a pre-surgical image obtained by magnetic resonance imaging or a different tomography method and thus, for example, establish whether there has been a displacement of tissue regions since the pre-surgical images were recorded. By way of example, in this manner it is possible to determine a so-called brain shift.

For explanatory purposes, the present invention was described in detail on the basis of exemplary embodiments. A person skilled in the art recognizes that the features of the individual exemplary embodiments can be combined with one another. By way of example, a light source which emits polarized light can be used in the illumination apparatus 17 shown in FIG. 1. The optical waveguide 51 then comprises at least one polarization-maintaining optical fiber. Likewise, in the exemplary embodiment shown in FIG. 3, it is possible to couple the light from the conventional light source 41 and/or the light from the laser 69 into an optical waveguide. If the light from the laser 69 is coupled into an optical waveguide, it is possible either for the whole optical waveguide to consist of polarization-maintaining optical fibers or for the optical waveguide to comprise at least one polarization-maintaining optical fiber and, therebeyond, consist of conventional optical fibers. Then, the light from the laser 69 would be coupled into the polarization-maintaining optical fibers. Moreover, a person skilled in the art recognizes that it is possible to deviate from the described exemplary embodiments without departing from the scope of the invention. By way of example, he identifies that the medical optical observation instrument can, for example, also be embodied as an endoscope rather than as a surgical microscope. In particular, a person skilled in the art also identifies that other polarization-rotating tissue can be contrasted instead of the nerve fiber tracts described in the exemplary embodiment. Therefore, the invention is merely intended to be restricted by the attached claims.

LIST OF REFERENCE SIGNS

2 Surgical microscope
3 Object field
5 Objective
7 Divergent beam
9 Beam
9A, 9B Stereoscopic partial beam path
11 Magnification changer
13A, 13B Interface arrangement
15A, 15B Beam splitter prism
17 Illumination apparatus
19A, 19B Adapter optics
21A, 21B Camera
23A, 23B Image sensor
27 Binocular tube
29A, 29B Tube objective
31A, 31B Intermediate image plane
33A, 33B Prism
35A, 35B Eyepiece lens
40A, 40B Linear analyzer
41 Light source
42 Illumination beam path
43 Deflection mirror
47 Linear polarizer
49 Coupling apparatus
50 Input end
51 Optical waveguide
52 Output end
53 Device for contrasting nerve fiber tracts
55 Image processing apparatus
57 Optimization apparatus
58 Surgical microscope
59A, 59B Interface arrangement
61A, 61B Beam splitter prism
63A, 63B Display
65A, 65B Display optics
67 Illumination optics
69 Infrared laser
70 Illumination beam path
71A, 71B Shutter
73 Surgical microscope
75 Introduction device
77 Introduction or switching-on device
79 Control unit
81 Navigation system
83 Storage medium

The invention claimed is:

1. A medical optical observation instrument, comprising
an illumination system, which comprises an illumination beam path for illuminating an observation object with illumination light;
an observation system, which comprises an observation beam path for producing an image of the observation object with the aid of observation light emanating from the observation object and at least one camera, to which observation light is fed for recording a digital image of the observation object; and
a device for contrasting polarization-rotating tissue in the observation object, which device is connected to the at least one camera for receiving the digital image of the observation object;
wherein the device for contrasting polarization-rotating tissue in the observation object comprises:
at least one illumination apparatus, arranged in the illumination system, comprising a polarization portion, which is suitable for producing illumination light with a linear polarization that is adjustable in the plane perpendicular to the optical axis of the illumination beam path;
at least one linear analyzer, arranged in the observation system and rotatable about the optical axis of the observation beam path, for determining the polarization direction of the observation light;
an image processing apparatus connected to the at least one camera for receiving the digital image of the observation object, which image processing apparatus establishes and outputs an image contrast value representing the image contrast in the digital image of the observation object; and
an optimization apparatus connected to the image processing apparatus for receiving the image contrast value and connected to the at least one rotatable linear analyzer and the polarization portion for outputting actuation signals, which optimization apparatus maximizes the image contrast value by adapting the polarization direction of the illumination light and the polarization direction of the linear analyzer with the aid of the actuation signals, wherein in maximizing the image contrast an orientation of the polarization direction of the linear analyzer is adjusted in relation to the orientation of the polarization direction of the illumination light,
a navigation data input for receiving navigation data from a navigation system;
a data input for receiving pre-surgical data;
an introduction device for introducing the at least one linear analyzer into the observation beam path;
an introduction or switching-on device for introducing the polarization portion into the illumination beam path or for switching on the polarization portion; and
a control unit for controlling the introduction device and the introduction or switching-on device, which control unit is connected to the data input for receiving pre-surgical data and connected to the navigation data input for receiving navigation data, establishes whether the medical optical observation instrument is directed onto polarization-rotating tissue on the basis of the received navigation data and the received pre-surgical data, and actuates the introduction device and the introduction or switching-on device when the medical optical observation instrument is directed onto polarization-rotating tissue.

2. The medical optical observation instrument as claimed in claim 1, wherein the observation system comprises two stereoscopic subsystems, each with a stereoscopic partial beam path, wherein a camera is arranged in each one of the stereoscopic subsystems, with observation light for recording a digital partial image of the observation object being fed to said camera such that the digital image of the observation object is a stereoscopic image.

3. The medical optical observation instrument as claimed in claim 2, wherein an eyepiece and a first beam splitter are arranged in each one of the stereoscopic subsystems, wherein the first beam splitter guides one portion of the observation light situated in the stereoscopic subsystem in the direction of the camera of the stereoscopic subsystem and another portion of the observation light situated in the stereoscopic subsystem in the direction of the eyepiece of the stereoscopic subsystem.

4. The medical optical observation instrument as claimed in claim 3, wherein a display and a second beam splitter are arranged in each one of the stereoscopic subsystems, wherein the second beam splitter is situated between the first beam splitter and the eyepiece and couples a beam path emanating from the display in the direction of the eyepiece into the stereoscopic partial beam path of the stereoscopic subsystem.

5. The medical optical observation instrument as claimed in claim 4, wherein a shutter is arranged between the first beam splitter and the second beam splitter in each one of the stereoscopic subsystems.

6. The medical optical observation instrument as claimed in claim 2, wherein a linear analyzer, which is arranged between the camera and the first beam splitter, is present in each one of the stereoscopic subsystems.

7. The medical optical observation instrument as claimed in claim 1, wherein the illumination apparatus comprises an illumination light source and, as a polarization portion, a linear polarizer, rotatable about the optical axis of the illumination beam path, for polarizing the illumination light emanating from the illumination light source.

8. The medical optical observation instrument as claimed in claim 1, wherein the illumination apparatus comprises an illumination light source emitting linearly polarized light as a polarization portion, which illumination light source is rotatably mounted about the optical axis of the illumination beam path.

9. The medical optical observation instrument as claimed in claim 7, wherein the illumination light source is a laser, an incandescent lamp or a luminescence emitter.

10. The medical optical observation instrument as claimed in claim 9, wherein the laser is an infrared laser.

11. The medical optical observation instrument as claimed in claim 7, wherein the illumination light source comprises a primary light source emitting the illumination light, a secondary light source, an optical waveguide with an input end and an output end, and a coupling apparatus for coupling the illumination light into the input end of the optical waveguide, wherein the output end of the optical waveguide forms the secondary light source.

12. The medical optical observation instrument as claimed in claim 11, in which the optical waveguide comprises a polarization-maintaining fiber.

13. The medical optical observation instrument as claimed in claim 11, wherein the linear polarizer is arranged between the output end of the optical waveguide and the observation object.

14. A method for contrasting polarization-rotating tissue by means of a medical optical observation instrument as claimed in claim 1, wherein
   a digital image of an observation object containing a polarization-rotating tissue is recorded with the aid of the cameras;
   the image contrast is established in the digital image of the observation object; and
   the image contrast is maximized by adapting the polarization direction of the illumination light and the polarization direction of the at least one linear analyzer.

* * * * *